(12) United States Patent
Shin et al.

(10) Patent No.: US 8,583,125 B2
(45) Date of Patent: Nov. 12, 2013

(54) RADIO ROUTING AGENT, CALL PROCESSING APPARATUS, AND COMMUNICATION METHOD OF TERMINAL

(75) Inventors: Sung Moon Shin, Daejeon (KR); Min Taig Kim, Daejeon (KR); Yeong Jin Kim, Daejeon (KR); Dae Sik Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/107,287

(22) Filed: May 13, 2011

(65) Prior Publication Data

US 2011/0287769 A1 Nov. 24, 2011

(30) Foreign Application Priority Data

May 13, 2010 (KR) .................... 10-2010-0045037
Apr. 13, 2011 (KR) .................... 10-2011-0034301

(51) Int. Cl.
*H04W 40/00* (2009.01)

(52) U.S. Cl.
USPC ........... 455/445; 370/325; 370/326; 370/328; 370/231

(58) Field of Classification Search
USPC .................. 370/325, 236, 231, 328; 455/445
See application file for complete search history.

(56) References Cited

U.S. PATENT DOCUMENTS

| 2005/0272428 A1* | 12/2005 | Tanabe et al. ................ 455/439 |
| 2008/0181113 A1* | 7/2008 | Narayanan et al. ........... 370/235 |
| 2009/0073924 A1 | 3/2009 | Chou |
| 2012/0236795 A1* | 9/2012 | Barzegar et al. .............. 370/328 |

FOREIGN PATENT DOCUMENTS

| JP | 2009-535961 | 10/2009 |
| KR | 10-2004-0071972 | 8/2004 |
| KR | 10-2009-0034111 | 4/2009 |
| KR | 10-2009-0113397 | 11/2009 |
| KR | 10-2010-0005347 | 1/2010 |

OTHER PUBLICATIONS

Matthew Sherman et al., "IEEE Standards Supporting Cognitive Radio and Networks, Dynamic Spectrum Access, and Coexistence," IEEE Communications Magazine, vol. 46, Issue 7, pp. 72-79, Jul. 2008.
Venkatesha Prasad et al., "Cognitive Functionality in Next Generation Wireless Networks: Standardization Efforts," IEEE Communications Magazine, vol. 46, Issue 4, pp. 72-78, Apr. 2008.

* cited by examiner

*Primary Examiner* — David Q Nguyen
(74) *Attorney, Agent, or Firm* — Staas & Halsey LLP

(57) ABSTRACT

When a call is attempted from a terminal that can transmit/receive data by connecting to different plurality of networks, a radio routing agent that is positioned at a core network selects an optimum wireless route from a plurality of wireless routes and provides the optimum wireless route based on an entire radio resource and a route state. Therefore, when a normal response is received by attempting a call to a call receiving terminal through the optimum wireless route that is selected by the radio routing agent, a call processing apparatus transmits the optimum wireless route to a terminal in which a call is attempted through a base station.

3 Claims, 4 Drawing Sheets

RADIO ROUTING AGENT, CALL PROCESSING APPARATUS, AND COMMUNICATION METHOD OF TERMINAL

CROSS-REFERENCE TO RELATED APPLICATION

This application claims priority to and the benefit of Korean Patent Application No. 10-2010-0045037 and 10-2011-0034301 filed in the Korean Intellectual Property Office on May 13, 2010 and Apr. 13, 2011, the entire contents of which are incorporated herein by reference.

BACKGROUND OF THE INVENTION (a) Field of the Invention

The present invention relates to a radio routing agent that provides an optimum wireless route, a call processing apparatus, and a communication method that a terminal communicates through the optimum wireless route.

(b) Description of the Related Art

With development of a smart phone, a future wireless/mobile communication system should be able to provide a super wide band/intelligent service, and in order to effectively provide the super wide band/intelligent service, it is expected that various access networks should operate to interlock with each other.

Further, as a terminal has a further wider band and becomes more intelligent, the terminal should be able to operate even in several forms of access networks.

In such an environment, the network should be able to efficiently use a radio resource by interlocking with various access networks, and the terminal should be able to reduce a communication cost by selecting an optimum wireless communication route appropriate for various and super high speed services.

In mobile to mobile communication or mobile to land or land to mobile communication, in a present wireless/mobile public network communication method, the terminal should necessarily pass through a core network (CN) via a base station.

Alternatively, in some adhoc-network, there is a method that limited terminals registered to the ad-hoc network directly communicate.

In the existing methods, because a method of supporting direct communication between terminals in a wireless/mobile public network does not exist, in consideration of a limited radio resource, a limitation exists in effectively supporting a future super wide band/intelligent service.

SUMMARY OF THE INVENTION

The present invention has been made in an effort to provide a radio routing agent, a call processing apparatus, and a method that a terminal communicates through an optimum wireless route having advantages of providing an optimum wireless route that supports mobile to mobile communication, mobile to base station communication, and base station to base station communication in order to effectively support a super wide band/intelligent wireless/mobile communication service in a future wireless/mobile communication system.

An exemplary embodiment of the present invention provides a radio routing agent. The radio routing agent includes a management unit that manages an entire radio resource and a route state; and a route selection unit that provides an optimum wireless route of a plurality of wireless routes based on an entire radio resource and a route state by interlocking with the management unit when a call is attempted from a terminal that can access different plurality of networks, transmit and receive data.

Another embodiment of the present invention provides a call processing apparatus. The call processing apparatus includes a query unit that queries and receives an optimum wireless route for a call processing to a radio routing agent that is positioned at a core network when a call is attempted from a terminal that can transmit and receive data by connecting to different plurality of networks; and a notification unit that provides the optimum wireless route to the terminal.

Yet another embodiment of the present invention provides a method that a terminal communicates. The method for a terminal to communicate by connecting to different plurality of networks and receiving/transmitting data, the method includes: transmitting a call to a base station; receiving an optimum wireless route from the base station, wherein the optimum wireless route is a wireless route that a radio routing agent that is positioned at a core network connected to the base station selects from a plurality wireless routes based on an entire radio resource and a route state; and communicating with a call receiving terminal through the optimum wireless route.

DETAILED DESCRIPTION OF THE EMBODIMENTS

Figure 1:
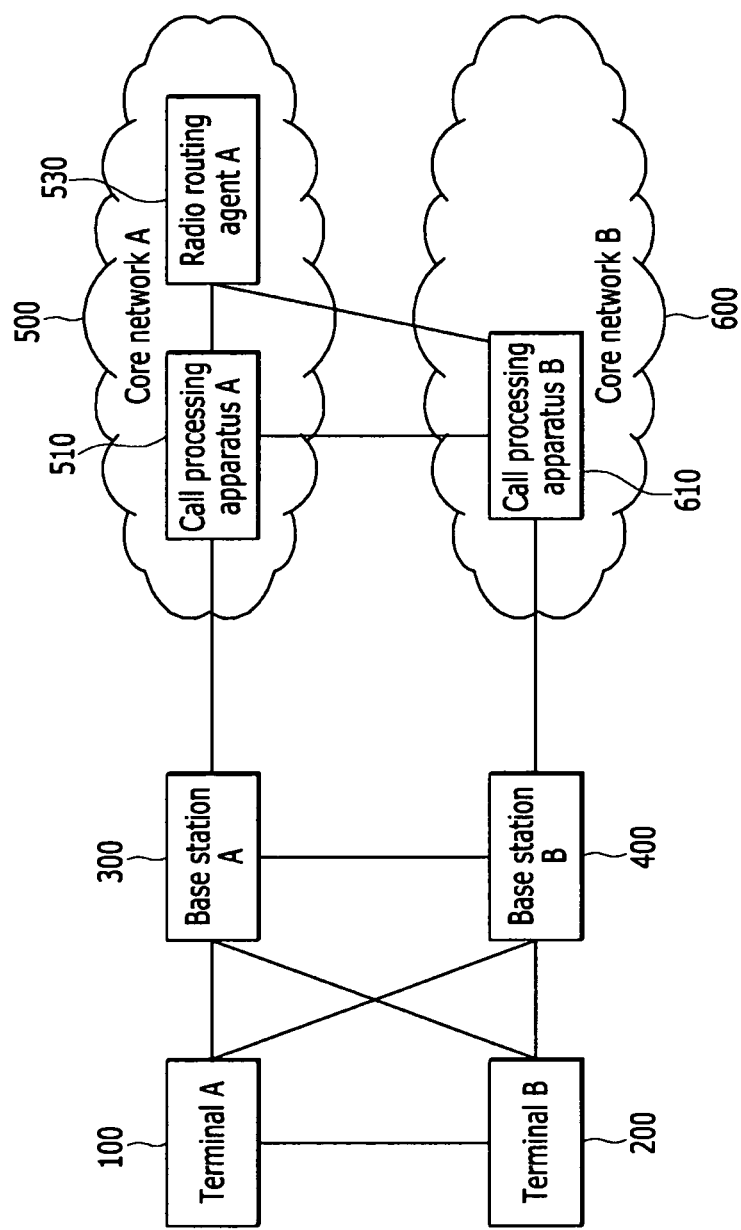
FIG. 1 is a diagram illustrating a configuration of a public wireless/mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and claims, unless explicitly described to the contrary, the word "comprise" and variations such as "comprises" or "comprising", will be understood to imply the inclusion of stated elements but not the exclusion of any other elements.

In the entire specification, a terminal may indicate a user equipment (UE), a mobile terminal (MT), a mobile station (MS), a subscriber station (SS), a portable subscriber station (PSS), and an access terminal (AT) and may include an entire function or a partial function of the MT, the MS, the SS, the PSS, and the AT.

Further, a base station (BS) may indicate an access point (AP), a node B, an evolved node B (eNode B), a radio access station (RAS), a base transceiver station (BTS), and a mobile multihop relay (MMR)-BS and may include an entire function or a partial function of the node B, the eNode B, the AP, the RAS, the BTS, and the MMR-BS.

Hereinafter, a radio routing agent that provides an optimum wireless route, a call processing apparatus, and a method that a terminal communicates through the optimum wireless route according to an exemplary embodiment of the present invention will be described with reference to the drawings.

FIG. 1 is a diagram illustrating a configuration of a public wireless/mobile communication system according to an exemplary embodiment of the present invention.

Referring to FIG. 1, in mobile to mobile communication or mobile to land or land to mobile communication in a wireless/mobile communication apparatus including all available wireless/mobile communication apparatuses, a terminal A 100, a terminal B 200, a base station A 300, and a base station B 400, which are wireless sector devices are regarded as one node (point) without separation of a terminal and a base station.

Here, the terminal A 100 and the terminal B 200 are wireless segment devices and are a complex terminal that can transmit/receive data by connecting to different plurality of access networks.

Further, the public wireless/mobile communication system of FIG. 1 has a configuration that is not largely different from that of a present mobile communication system but has the difference from two viewpoints.

First, the public wireless/mobile communication system of FIG. 1 does not indicate a specific mobile communication system and includes all mobile communication systems that an operation company may use.

For example, when a specific operation company may operate four systems such as code division multiple access (CDMA), wideband code division multiple access (WCDMA), long term evolution (LTE), and a wireless Internet network (WiFi), the public wireless/mobile communication system of FIG. 1 is a system including all four systems.

Here, a core network A 500 and a core network B 600 indicate two available systems of a specific provider.

Further, because all public wireless/mobile communication systems are formed with a terminal, a base station, and a core network, the terminals 100 and 200, the base stations 300 and 400, and the core networks 500 and 600 of FIG. 1 are a terminal, a base station, and a core network corresponding to all four systems.

Second, the core network 500 includes a radio routing agent 530 that grasps an entire radio resource and a route state and notifies a subscriber of an optimum route corresponding to a subscriber's service based on the entire radio resource and the route state.

Here, the radio routing agent 530 should manage an entire radio resource of an available system, and FIG. 1 illustrates one radio routing agent.

The radio routing agent 530 obtains optimum routes between the terminals 100 and 200, which are a wireless communication segment device, and the base stations 300 and 400, and supports communication between wireless nodes based on the optimum routes. The radio routing agent 530 dynamically obtains and provides an optimum wireless route between the nodes 100, 200, 300, and 400 from a network.

An optimum wireless route between the terminal A 100 that attempts a call and another subscriber terminal B 200 to receive a call may be formed with several nodes, and such an optimum wireless route is received from the radio routing agent 530.

Figure 2:
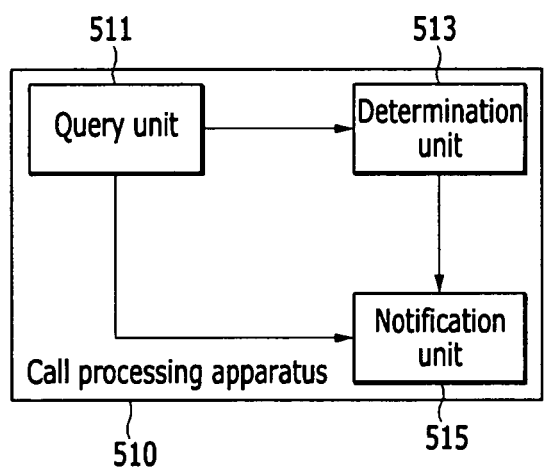
FIG. 2 is a block diagram illustrating al configuration of a call processing apparatus according to an exemplary embodiment of the present invention.

FIG. 2 is a block diagram illustrating a configuration of a call processing apparatus according to an exemplary embodiment of the present invention. Referring to FIG. 2, a call processing apparatus 510 includes a query unit 511, a determination unit 513, and a notification unit 515.

When a call is attempted from the terminal A 100, the query unit 511 queries and receives an optimum wireless route for a call processing to the radio routing agent 530 that is positioned at the core network A 500.

The determination unit 513 attempts a call to a call processing apparatus B 610 that is included in the optimum wireless route provided from the query unit 511 and determines whether a normal response to the call is received.

When the determination unit 513 receives a normal response from the call processing apparatus B 610 that is included in the optimum wireless route, the notification unit 515 transmits the optimum wireless route to the terminal A 100.

In this case, when the determination unit 513 does not receive a normal response from the call processing apparatus B 610 that is included in the optimum wireless route, the query unit 511 queries again and receives an optimum wireless route to the radio routing agent 530.

Figure 3:
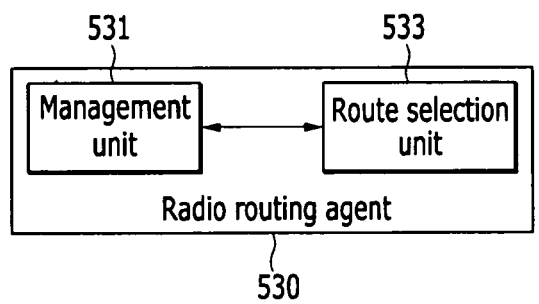
FIG. 3 is a block diagram illustrating a configuration of a radio routing agent according to an exemplary embodiment of the present invention.

FIG. 3 is a block diagram illustrating a configuration of a radio routing agent according to an exemplary embodiment of the present invention.

Referring to FIG. 3, the radio routing agent 530 includes a management unit 531 and a route selection unit 533.

The management unit 531 manages an entire radio resource and a route state.

When a call is attempted from the terminal A 100, the route selection unit 533 selects an optimum wireless route of a plurality of wireless routes and provides the optimum wireless route to the call processing apparatus A 510 based on an entire radio resource and a route state by interlocking with the management unit 531 according to a request of the call processing apparatus A 510.

In this case, when the call processing apparatus A 510 fails in a call processing at the optimum wireless route, the route selection unit 533 receives again a query for an optimum wireless route. Accordingly, the route selection unit 533 reselects an optimum wireless route of a plurality of wireless routes based on an entire radio resource and a route state by interlocking with the management unit 531.

In this way, in a configuration of FIGS. 2 and 3, when a call processing at an optimum wireless route is failed, a reselection of the optimum wireless route is repeated.

Hereinafter, communication processes between terminals through an optimum wireless route based on the above-described configuration will be described with reference to FIG. 4.

Figure 4:
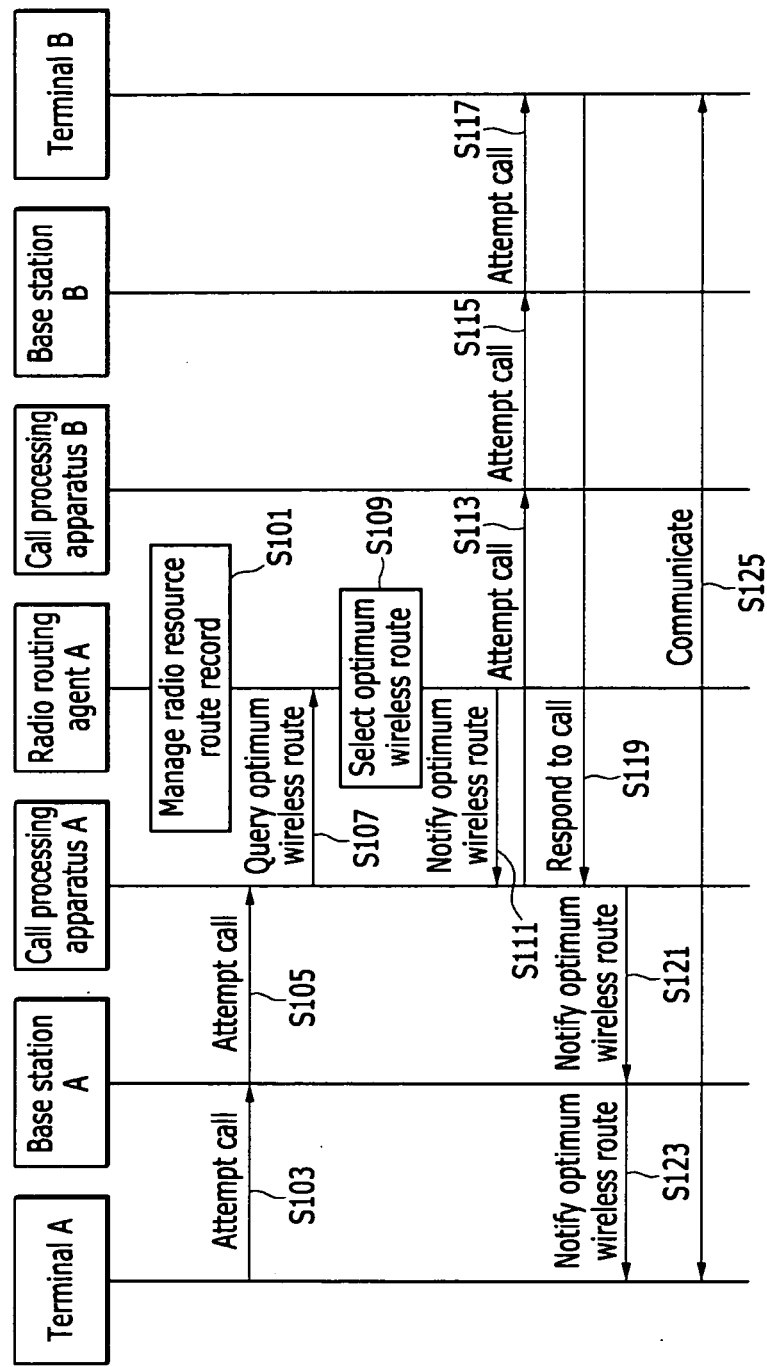
FIG. 4 is a flowchart illustrating communication processes between terminals through an optimum wireless route according to an exemplary embodiment of the present invention.

FIG. 4 is a flowchart illustrating communication processes between terminals through an optimum wireless route according to an exemplary embodiment of the present invention.

Referring to FIG. 4, the radio routing agent 530 manages a radio resource route record that is collected at a network (S101).

Thereafter, the terminal A 100 attempts a call to the base station A 300 (S103). Thereafter, the base station A 300 transmits a call attempt signal of the terminal A 100 to the call processing apparatus A 510 of the core network A 500 (S105).

The call processing apparatus A 510 queries an optimum wireless route to the radio routing agent 530 according to a service of a request call (S107).

Thereafter, the radio routing agent 530 selects an optimum wireless route corresponding to a service of a requested call according to a managing radio resource route record (S109) and notifies the call processing apparatus A 510 of the optimum wireless route (S111).

The call processing apparatus A 510 attempts a call to the call processing apparatus B 610, the base station B 400, and the terminal B 200 on the notified optimum wireless route (S113, S115, and S117).

In this case, when a normal call response to the call is received (S119), the call processing apparatus A 510 notifies the base station A 300 of the optimum wireless route (S121). Thereafter, the base station A 300 notifies the terminal A 100 of the optimum wireless route (S123).

Thereafter, the terminal A 100 communicates with another terminal, i.e., the terminal B 200 according to notified optimum wireless route information (S125).

When a problem occurs at any one of the above steps, necessary steps including previous steps are repeatedly performed until the problem is dissolved.

Further, the optimum wireless route may occasionally dynamically change according to a radio resource state, and when it is necessary to change a route, steps S103-S125 are performed.

According to an exemplary embodiment of the present invention, a terminal and a base station are regarded as one node (point) without separation of a terminal and a base station in wireless segment communication, and in communication between nodes, by dynamically obtaining an optimum route from a network and performing communication, communication between nodes is coupled to each other and released, whereby radio resource use efficiency is remarkably increased.

Therefore, a super wide band/intelligent wireless/mobile communication service can be effectively supported.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A radio routing agent comprising:
   a management unit that manages an entire radio resource of an available system, and a route state; and
   a route selection unit that provides an optimum wireless route of a plurality of wireless routes based on an entire radio resource and a route state by interlocking with the management unit when a call is attempted from a terminal that can access a different plurality of networks, transmit and receive data,
   wherein an optimum wireless route query is received from a call processing apparatus that is connected to the terminal, the route selection unit selects an optimum wireless and transmits the optimum wireless route to the call processing apparatus, and
   wherein when the call processing apparatus fails in a call processing in the optimum wireless route, if the optimum wireless route query is received again, the route selection unit reselects an optimum wireless route of a plurality of wireless routes based on an entire radio resource and a route state by interlocking with the management unit.

2. A method for a terminal to communicate by connecting to different plurality of networks and receiving/transmitting data, the method comprising:
   transmitting a call to a base station;
   receiving an optimum wireless route from the base station, wherein the optimum wireless route is a wireless route that a radio routing agent positioned at a core network connected to the base station selects from a plurality wireless routes based on an entire radio resource and a route state; and
   communicating with a call receiving terminal through the optimum wireless route,
   the optimum wireless route is selected and transmitted by a route selection until to the call processing apparatus that is connected to the terminal when an optimum wireless route query is received from the call processing apparatus, and when a call processing in the optimum wireless route fails, if the optimum wireless route query is received again, an optimum wireless route is reselected from a plurality of wireless routes based on the entire radio resource and the route state.

3. The method of claim 2, wherein the optimum wireless route is a route in which a normal call response is received from the call receiving terminal.

* * * * *